United States Patent
Hu et al.

(10) Patent No.: US 8,854,994 B2
(45) Date of Patent: Oct. 7, 2014

(54) METHOD FOR MITIGATING OUTAGES IN HETEROGENEOUS NETWORKS

(75) Inventors: Teck Hu, Melbourne, FL (US); Matthew Baker, Swindon (GB); Fang-Chen Cheng, Murray Hill, NJ (US); Jung Ah Lee, Murray Hill, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 221 days.

(21) Appl. No.: 13/042,757

(22) Filed: Mar. 8, 2011

(65) Prior Publication Data
US 2011/0249579 A1  Oct. 13, 2011

Related U.S. Application Data

(60) Provisional application No. 61/342,168, filed on Apr. 10, 2010.

(51) Int. Cl.
*H04W 24/00* (2009.01)
*H04L 5/00* (2006.01)

(52) U.S. Cl.
CPC .............. *H04L 5/0053* (2013.01); *H04L 5/001* (2013.01); *H04L 5/0091* (2013.01); *H04L 5/0057* (2013.01); *H04L 5/00* (2013.01)
USPC ........................................................ 370/252

(58) Field of Classification Search
USPC .................................. 370/252, 310, 431, 464
See application file for complete search history.

(56) References Cited

U.S. PATENT DOCUMENTS

| | | | |
|---|---|---|---|
| 7,436,757 B1 * | 10/2008 | Wilson et al. | 370/203 |
| 2004/0087328 A1 * | 5/2004 | Ronkainen | 455/522 |
| 2008/0108369 A1 * | 5/2008 | Visotsky et al. | 455/455 |
| 2008/0233964 A1 * | 9/2008 | McCoy et al. | 455/450 |
| 2009/0135787 A1 | 5/2009 | Uemura et al. | |
| 2009/0257356 A1 * | 10/2009 | Frederiksen et al. | 370/252 |
| 2009/0325624 A1 * | 12/2009 | Centonza | 455/522 |
| 2010/0118800 A1 | 5/2010 | Kim et al. | |
| 2010/0208608 A1 * | 8/2010 | Wang | 370/252 |

FOREIGN PATENT DOCUMENTS

| | | |
|---|---|---|
| EP | 2326131 A1 | 5/2011 |
| EP | 2334134 A2 | 6/2011 |
| GB | 2461464 A | 1/2010 |
| WO | WO2008/133415 A1 | 11/2008 |
| WO | WO2010/027035 A1 | 3/2010 |
| WO | WO2010/039011 A2 | 4/2010 |

OTHER PUBLICATIONS

R1-100945, "DL Pico/Macro HetNet Performance: Cell Selection", Alcatel-Lucent, Alcatel-Shanghai Bell, RAN1#60, San Francisco, Mar. 2010.

(Continued)

*Primary Examiner* — Andrew Lai
*Assistant Examiner* — Zhiren Qin
(74) *Attorney, Agent, or Firm* — Davidson Sheehan LLP

(57) ABSTRACT

The present invention provides a method for mitigating outages in wireless communication systems using feedback for control channels formed by aggregating groups of resource blocks or resource elements, the method. One embodiment of the method includes generating control channel feedback at user equipment. The control channel feedback is generated using one or more measurements performed on signals received at the user equipment over a downlink control channel at a current aggregation level. The method also includes transmitting the control channel feedback over an uplink channel and using this information for the optimal implementation of Cell range expansion by the network.

18 Claims, 5 Drawing Sheets

(56) References Cited

OTHER PUBLICATIONS

R1-101874 Co-Channel Control Channel Performance for Hetnet-rl. doc, Alcatel-Lucent, Alcatel-Shanghai Bell, RAN1#60, San Francisco, Mar. 2010.
R1-102185, "Discrepancy between Channel Quality of PDCCH and CQI Feedback with CA" Samsung, Apr. 8, 2010.
Draft Report of 3GPP TSG RAN WG1 #60 v0.1.0.
R1-102807, "Enhancements of Rel. 8 CQI for HetNet", Alcatel-Lucent Shanghai Bell, Alcatel-Lucent, RAN 1#61, Montreal Canada, May 2010.
International Search Report PCT/US2011/031314 dated Sep. 26, 2011.
Written Opinion dated Sep. 26, 2011.

* cited by examiner

METHOD FOR MITIGATING OUTAGES IN HETEROGENEOUS NETWORKS

This application claims priority from prior U.S. provisional patent application Ser. No. 61/342,168 filed on Apr. 10, 2010.

BACKGROUND OF THE INVENTION

1. Field of the Invention

This invention relates generally to communication systems, and, more particularly, to wireless communication systems.

2. Description of the Related Art

A conventional communication system uses one or more access nodes to provide network connectivity to one or more mobile nodes. The access nodes may be referred to as access points, access networks, base stations, base station routers, cells, femtocells, pico-cells, and the like. For example, in a cellular communication system that operates according to Universal Mobile Telecommunication Services (UMTS) standards, one or more nodes may be used to provide wireless network connectivity to mobile nodes. The mobile nodes may include cellular telephones, personal data assistants, smart phones, text messaging devices, Global Positioning Systems, navigation systems, network interface cards, notebook computers, desktop computers, and the like. Numerous types and generations of wireless communication systems have been developed and deployed to provide network connectivity to mobile nodes. Exemplary wireless communication systems include systems that provide wireless connectivity to micro cells (e.g., systems that provide wireless connectivity according to the IEEE 802.11, WEE 802.15, or standards) and systems that provide wireless connectivity to macro cells (e.g., systems that operate according to the Third Generation Partnership Project standards—3GPP, 3GPP2—and/or systems operate according to the IEEE 802.16 and IEEE 802.20 standards). Multiple generations of these systems have been deployed including Second Generation (2G), Third Generation (3G), and Forth Generation (4G).

The coverage provided by different service providers in a heterogeneous communication system may intersect and/or overlap. For example, a wireless access node for a wireless local area network may provide network connectivity to mobile nodes in a micro cell or pico-cell associated with a coffee shop that is within the macro cell coverage area associated with a base station of a cellular communication system. For another example, cellular telephone coverage from multiple service providers may overlap and mobile nodes may therefore be able to access the wireless communication system using different generations of radio access technologies, e.g., when one service provider implements a 3G system and another service provider implements a 4G system. For yet another example, a single service provider may provide coverage using overlaying radio access technologies, e.g., when the service provider has deployed a 3G system and is in the process of incrementally upgrading to a 4G system.

The network can instruct access nodes to hand off, e.g., from a macrocell to an overlying microcell, even when the access node detects a stronger signal from the macrocell than the microcell. This technique is referred to as cell expansion because it effectively expands the range of the microcell by applying a bias to the user equipment. Research has demonstrated that cell expansion in a mixed micro/macro cell environment may have a number of advantages. For example, transferring or handing off user equipment (UE) from the macrocells to the microcells increases the number of UE served by microcells and may lead to splitting gains that can enhance the overall capacity of the heterogeneous network. Cell selection enhancements may be implemented in order to improve the cell association to optimize the performance in a system with non-uniform coverage resulting from the very different downlink power transmitted by the macrocells and the microcells. Maximizing the gains from cell expansion in microcells may therefore be a valuable tool for increasing the spectrum available to operators of heterogeneous networks.

Modeling of the performance gains from cell expansion typically assumes that the macrocells and the microcells do not mutually interfere. However, interference between data channels and control channels is expected in actual deployments of heterogeneous networks. For example, interference between control channels used in overlapping macrocells and microcells can lead to an increase in outages due to control channel failures. Studies have suggested that outages due to Physical Downlink Control Channel (PDCCH) failure can increase in microcells when cell expansion is used for the microcells. The effect of interference between the overlapping cells is exacerbated in co-channel and overlap deployments because the control channels for the macrocells and microcells share the same frequencies and/or timeslots in the overlapping regions. Control channels in this kind of heterogeneous deployment would experience significant mutual interference which can lead to control channel decoding failures and outages. Unfortunately, widespread co-channel deployments are a likely (and perhaps inevitable) response to the growth in bandwidth intensive applications that already stretch the capacity of existing networks.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for mitigating outages in wireless communication systems. One embodiment of the method includes generating control channel feedback at user equipment. The control channel feedback is generated using one or more measurements performed on signals received at the user equipment over a downlink control channel at a current aggregation level. The method also includes transmitting the control channel feedback over an uplink channel.

In another embodiment, a method is provided for mitigating outages in wireless communication systems. This embodiment includes receiving control channel feedback from user equipment at an access node. The control channel feedback is generated using one or more measurements performed on signals transmitted from the access node over a downlink control channel at a current aggregation level. The method also includes deciding whether to modify the current aggregation level based on the control channel feedback.

In yet another embodiment, a method is provided for mitigating outages in wireless communication systems. This embodiment includes receiving control channel feedback from user equipment at an access node. The control channel feedback is generated using one or more measurements performed on signals transmitted from the access node over a downlink control channel at a current aggregation level. The method also includes deciding whether to perform cell expansion based on the control channel feedback.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
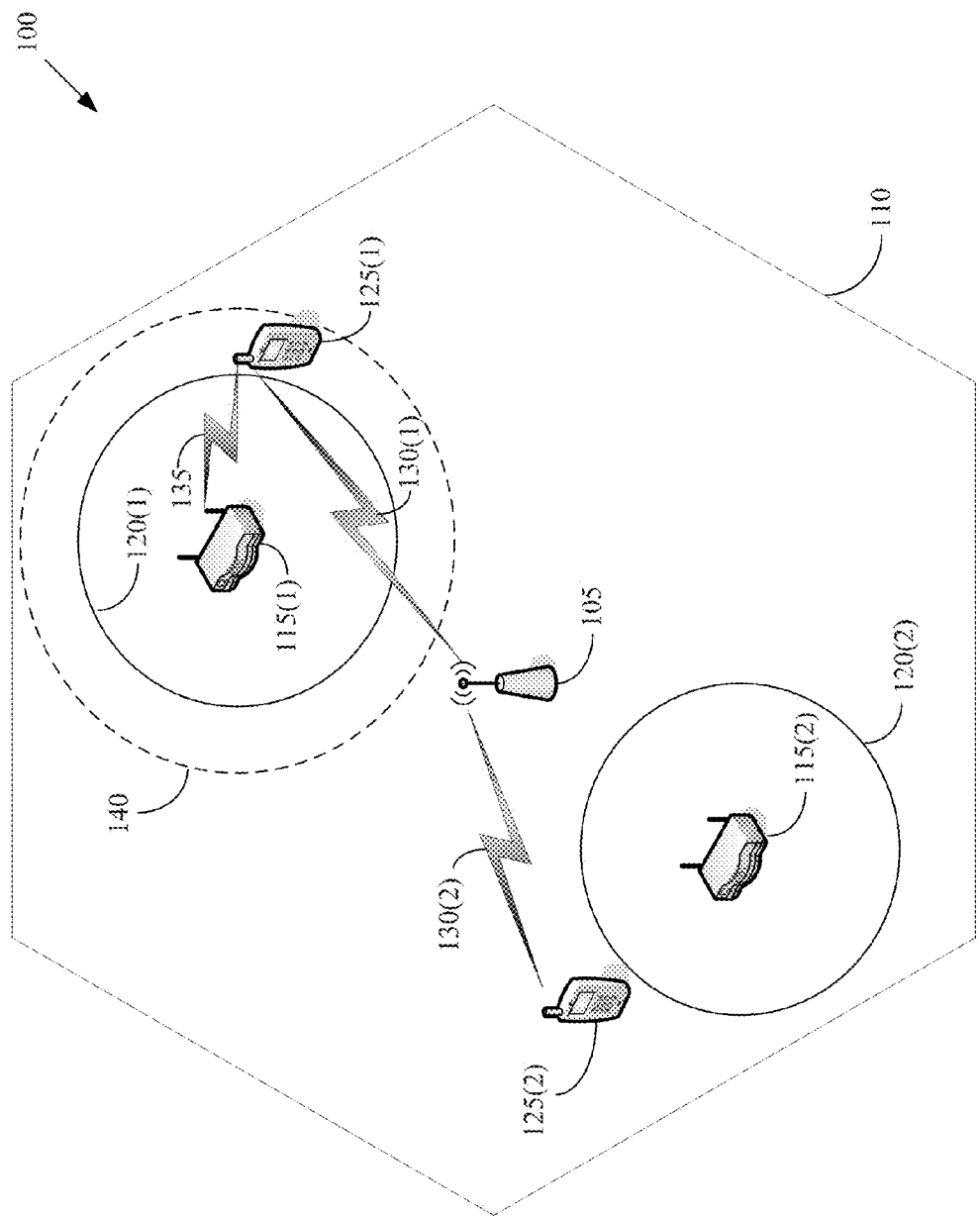
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for mitigating outages in wireless communication systems that can occur when downlink control channels fail. Downlink control channels typically use a predetermined modulation and a more robust coding scheme and/or rate than the associated downlink data channels, at least in part because user equipment blindly decodes the downlink control channels and failure to correctly decode the downlink control channels may make it impossible to receive the corresponding downlink data channel. The downlink data channels are therefore likely to fail before the corresponding control channels when channel conditions degrade. However, heterogeneous networks that include cells that operate according to different wireless access technologies may generate substantial intercellular interference that can disrupt the operation of downlink control channels, particularly in overlapping co-channel deployments. Downlink control channel failures may reduce capacity and/or throughput gains that could be achieved by applying cell expansion techniques in the heterogeneous network.

Estimating the downlink control channel quality may enable the network to reduce or avoid downlink control channel failures. Indirect quality indicators can be used to estimate or guess channel qualities for the downlink control channels. For example, the absence of an expected transmission may indicate a failure at the receiver, which may suggest poor downlink channel quality. This type of channel quality indication relies on hypothesis testing and detection of a discontinuous transmission (DTX) at the base station, such as an uplink DTX following transmission of an uplink scheduling grant or an uplink acknowledgment (ACK/NACK) DTX detection after a downlink transmission. This approach is therefore indirect because the failure can be attributed to more than one cause. The downlink control channel quality may also be probed by sending random uplink scheduling grants to user equipment. Reception of a buffer status report in response to the probe may then indirectly indicate that the downlink control channel was correctly decoded.

Alternatively, downlink data channel feedback can be used as an indirect indication of the downlink control channel quality. However, the downlink data channel feedback only indicates channel quality for the subcarriers, frequencies, and timeslots that are used for the downlink control channels. Since the downlink data channels use mutually exclusive resource blocks, the network has to map the downlink data channel feedback to the parameters of the downlink control channels. Mapping feedback from the downlink data channels to the downlink control channels requires additional processing and does not necessarily provide an accurate indication of the downlink control channel qualities because of effects such as frequency-dependent and/or time-dependent fading. Deriving control channel quality information from data channel quality information is further complicated by the fact that the data channel quality information is generated for a less stringent constraint than the control channel quality information. For example, user equipment may report a modulation and coding scheme (MCS) for the downlink data channel that is expected to achieve a 10%-block error rate (BLER) at the user equipment. Control channels should be more robust and are typically configured to achieve a pre-defined target quality, e.g., at least a 1% BLER.

Direct indications of the downlink control channel quality may alternatively be provided. In one embodiment, user equipment can generate control channel feedback using measurements performed on signals received over a downlink control channel at a current aggregation level. The channel quality information may include state information such as an average signal-to-noise ratio (SNR) for the downlink control channel and/or channel state information (CSI) for the downlink control channel. For example, the user equipment may return information that indicates an aggregation level that provides sufficient signal energy to achieve a predefined target quality, e.g., at least 1% BLER, on a physical downlink control channel (PDCCH). The user equipment may also report the "headroom" between the aggregation level used for the predefined target quality, e.g., the 1% BLER aggregation level, and the next higher aggregation level. The headroom report may include information indicating that a current signal-to interference-plus-noise ratio (SINK) is approximately a certain number of decibels away from the level at which the next aggregation level would need to be used to achieve the predefined target BEER on the PDCCH. The network can use the direct indications of the downlink control channel quality to select the appropriate aggregation level and/or to decide whether to perform cell expansion, e.g., by transmitting a handover bias or offset to the user equipment.

FIG. 1 conceptually illustrates one exemplary embodiment of a wireless communication system 100. In the illustrated embodiment, the wireless communication system 100 implements a heterogeneous network that provides wireless connectivity over air interfaces that operate according to different wireless access technologies. For example, one or more base stations 105 may provide wireless connectivity to a sector or cell 110 according to cellular wireless communication technologies such as the cellular technologies defined by the Third Generation Partnership Project (3GPP, 3GPP2) and/or Telecommunications and Internet converged Services and Protocols for Advanced Networking (TISPAN) standards and/or protocols. The base stations 105 typically provide wireless connectivity to a relatively large cell 110 and so they are typically referred to as macrocells. Wireless connectivity may also be provided by other types of access nodes such as access points 115 that provide wireless connectivity to hotspots 120 using wireless access technologies such as WiMAX, Wi-Fi, IEEE standards, 3GPP, and the like. The access points 115 typically provide connectivity to a relatively small hotspot 120 and so they are typically referred to as macrocells, femtocells, picocells, and the like.

The heterogeneous network may be configured so that the cells 110 and the hotspots 120 overlap in at least some geographical areas. User equipment such as mobile units 125 may therefore access the heterogeneous network using either the base station 105 or the access nodes 115 when the mobile units 125 are in overlapping regions. In one embodiment, the heterogeneous network may implement a co-channel deployment so that at least a portion of the channel structures used by the base station 105 and the access nodes 115 overlap in frequency and/or time. For example, the base station 105 and the access nodes 115 may use channel structures that include subcarriers at the same frequencies and allocate the same timeslots to data channels (e.g., physical downlink shared channels, PDSCH) and control channels (e.g., physical downlink control channels, PDCCH). Communications with the base station 105 and the access nodes 115 may therefore interfere at least in part because transmissions such as control channel transmissions overlap in location, frequency, and/or time.

The mobile units 125 can perform measurements to determine characteristics of downlink signals transmitted by the base station 105 and/or the access nodes 115 over air interfaces 130, 135. In the illustrated embodiment, the mobile units 125 can measure signal strengths, interference levels, noise levels, and the like for downlink control channel signals. This information can be used to determine characteristic ratios such as signal-to-noise ratios (SNRs) and signal-to-interference-plus-noise ratios (SINRs) for the downlink control channels. The mobile units 125 can also determine block error rates (BLERs) for the downlink control channel signals by collecting statistics on the errors (e.g., decoding failures at the mobile unit) for signals on the downlink control channels. In some embodiments, similar measurements may also be performed on the downlink data channels. These measurements may make the mobile units 125 aware of the block error rates produced by the measured signal strengths, interference levels, noise levels, and the like. This information can then be used to calculate an energy and/or signal strength that is expected to produce a particular target BLER (or other target quality parameter) on the downlink control channel, such as a 1% BLER. The mobile units 125 can then transmit feedback to the access nodes 105, 115 that indicates the transmission parameters that should produce at most the target BLER. For example, the mobile unit may provide feedback indicating an aggregation level that is expected to produce at most a 1% BLER on the downlink control channel.

The access nodes 105, 115 may use the feedback provided by the mobile units 125 to adjust or modify the transmission powers used for communication over the air interfaces 130, 135. For example, if the mobile units 125 provide feedback indicating that the current BLER is somewhat less than or approximately equal to a predefined target value of 1%, then the access nodes 105, 115 may continue to transmit downlink control channel signals using the current transmission parameters such as the current aggregation level of resource blocks. However, if the mobile units 125 provide feedback indicating that the current BLER is greater than 1%, which indicates that insufficient transmission power is being used, or significantly less than 1% (e.g., 0.1%), which may indicate that too much transmission power is being used and therefore wasted and/or causing excessive interference, the access nodes 105, 115 may modify the current transmission parameters to bring the BLER closer to the desired level of approximately 1%.

In some embodiments, cell expansion may also be performed on the basis of the feedback received from the mobile units 125. For example, the mobile unit 125(1) may initially be connected to the base station 105 over the air interface 130(1). The base station 105 (or some other entity in the network 100) may determine that the mobile unit 125(1) should be handed off to the access node 115(1) even though the mobile unit 125(1) is outside of the cell 120(1). Exemplary reasons for handing off the mobile unit 125(1) include, but are not limited to, increasing the overall capacity or throughput of the system 100, load-balancing between the access nodes 105, 115, and the like. The base station 105 may therefore use the feedback received from the mobile unit 125(1) to determine the likelihood that the mobile unit 125(1) can successfully receive downlink control channel information from the access node 115(1). If the probability of successfully decoding the downlink control channel information is sufficiently high, then cell expansion may be performed, e.g., by transmitting a cell bias or offset to the mobile unit 125(1). For example, cell expansion may be performed if the BLER is expected to be less than or on the order of a predefined target value such as 1% on the PDCCH of the target node. The bias may be applied to signal strength measurements performed by the mobile unit 125(1) so that the mobile unit 125(1) may hand off to the access node 1150) even though the signal strength from the access node 115(1) may be smaller than the signal strength from the base station 105. The mobile unit 125(1) therefore operates as if the size of the cell 120(1) has increased to the expanded cell size 140 that is defined by a selected value of the ratio of the cell strength from the macrocell to the sum of the signal strength from the microcell plus the bias or offset.

Figure 2:
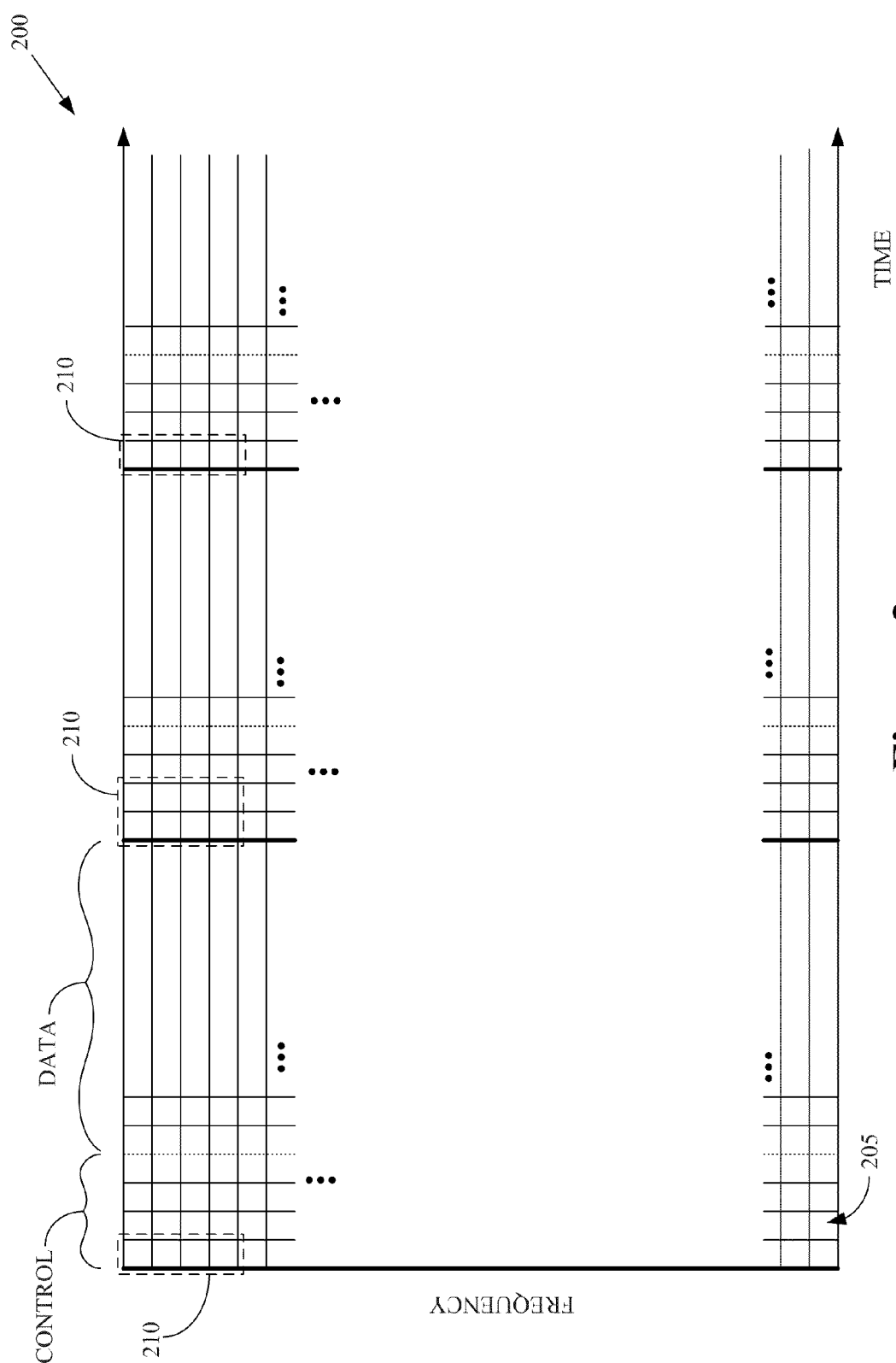
FIG. 2 conceptually illustrates one exemplary embodiment of a channel structure.

FIG. 2 conceptually illustrates one exemplary embodiment of a channel structure 200. In the illustrated embodiment, the channel structure 200 is divided into subcarriers composed of individual resource blocks 205 (only one indicated by a distinguishing numeral in FIG. 2). Each resource block 205 encompasses the frequency bandwidth of the subcarrier for a selected time interval or time slot. The number of subcarriers, frequencies, and timeslots, as well as the overall bandwidth of the channel structure 200, the individual bandwidth of the frequencies, and the durations of the timeslots are matters of design choice. The channel structure 200 represents the downlink channel structure and is divided into control channels and data channels. Control channels are used for transmitting control information such as the modulation and coding scheme (MCS) that allows user equipment to receive, demodulate, and decode the data channels. Control channels are blindly decoded by user equipment and failure of the blind decoding of the control channel typically leads to failure of the data channels because the control information is not available. In the illustrated embodiment, the control channel includes the first 4 timeslots of each frame and the data channel comprises the remaining timeslots. The boundaries between the frames are shown as bold lines in FIG. 2. In alternative embodiments, other arrangements of the control and data channels may be implemented.

Each control channel is formed by aggregating groups of resource blocks or resource elements. In the illustrated embodiment, a control channel 210 is allocated one group of four resource blocks. This aggregation level may be indicated by an aggregation level number such as 0 that indicates that this is the lowest level of aggregation and therefore four resource blocks are the smallest grouping or aggregation of resource blocks to be allocated to a single control channel. This grouping may be referred to as a control channel element. Higher aggregation levels include more control channel elements. However, persons of ordinary skill in the art having benefit of the present disclosure should appreciate that this particular choice of the number of resource elements in the control channel element for the lowest aggregation level is intended to be illustrative. Alternative embodiments may use different groupings of resource blocks. For example, a control channel element in alternative embodiments may include nine resource blocks. For another example, control channel elements may be formed of a selected number (e.g., 9) of resource element groups that each includes a selected number (e.g., 4) of resource elements.

Control channel feedback can be used to modify the aggregation level for a control channel. In the illustrated embodiment, the base station transmitting the downlink control channel structure 200 receives feedback from the user equipment regarding transmissions on the control channel 210. The feedback indicates that more energy is requested to achieve a lower BLER and so the feedback indicates a request that the control channel 210 be transmitted using a higher aggregation level so that more resource blocks are used for the control channel 210. The base station can then modify the control channel 210 in the subsequent timeframe to use the next higher aggregation level, which includes twice as many resource blocks 205. In one embodiment, the control channel feedback may also include information indicating the headroom between the lower aggregation level and the next higher aggregation level and this control channel feedback may be used to decide whether or not to use the next higher aggrega-tion level. Control channel feedback generated using the control channel information transmitted in the second timeframe at the higher aggregation level may indicate that a lower aggregation level should be used, e.g., because the measured BLER is significantly smaller than the target level indicating that energy may be being wasted and/or excessive interference is being produced. The base station may therefore modify the aggregation level of the control channel 210 to a lower value in the third timeframe.

Figure 3:
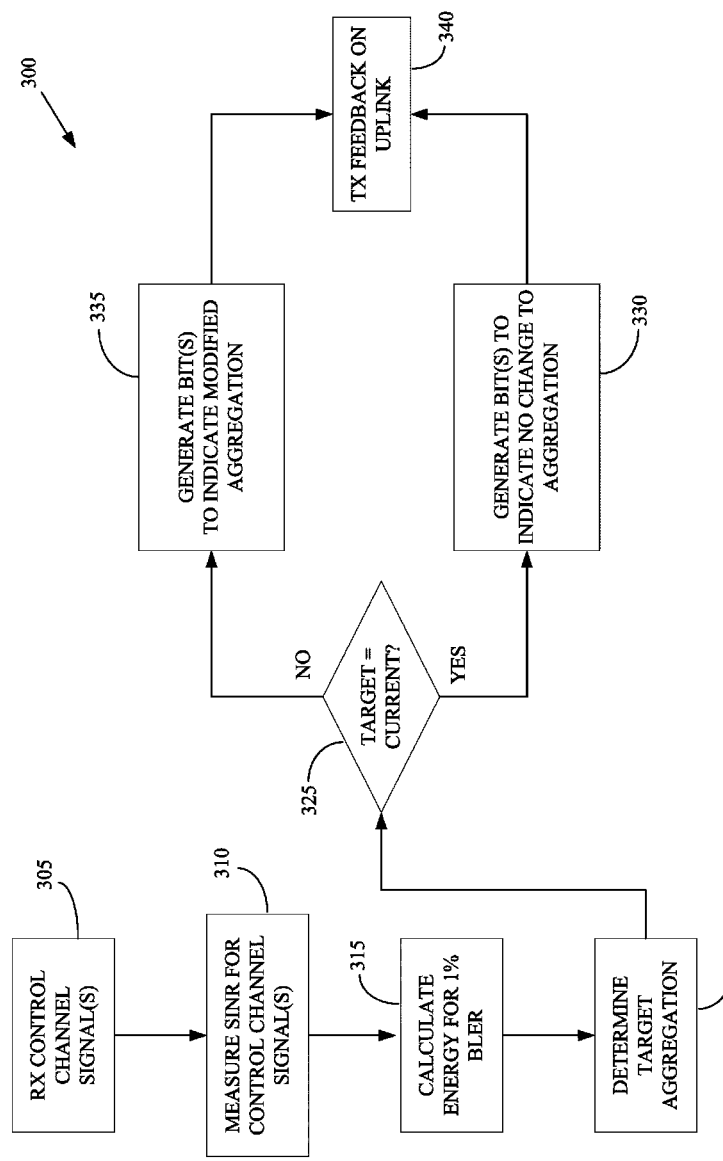
FIG. 3 conceptually illustrates a first exemplary embodiment of a method of generating control channel feedback.

FIG. 3 conceptually illustrates a first exemplary embodiment of a method 300 of generating control channel feedback. In the illustrated embodiment, the user equipment receives (at 305) signals from a base station over one or more downlink control channels that are transmitted at an initial aggregation level. The user equipment can then measure at 310) signal strengths, interference levels, noise levels, and the like, which can be used to calculate signal-to-noise ratios (SNRs) and/or signal-to-interference-plus-noise ratios (SINRs) for the downlink control channels. These measurements can be used to generate the feedback information. In one embodiment, the feedback information may indicate the average SNR and/or channel state information (CSI) for a current or target downlink control channel aggregation level. The measurements can be used with known or estimated error rates to determine (at 315) an estimate of the energy needed to achieve at least a predefined target value of a block error rate (BLER) for transmissions over the downlink control channels. For example, if the current BLER is higher than 1%, the user equipment can estimate how much additional energy would be needed to reduce the BLER to approximately 1% or less.

A target aggregation level for the downlink control channels can be determined (at 320) based on the feedback information. For example, if the user equipment determines (at 315) that additional energy is needed to reduce the BLER, the user equipment can determine (at 320) a target aggregation level that is higher than the current aggregation level. Alternatively, the user equipment may decide that the target BLER can be achieved using less energy and so the user equipment may determine (at 320) that the target aggregation level can be reduced from the current aggregation level. The user equipment decides (at 325) whether the target aggregation level is the same as the current aggregation level, if so, the user equipment can generate (at 330) feedback information such as bits that indicate no change to the current aggregation level. For example, the feedback information may include a set of bits that represents a request to change the aggregation level. The user equipment may generate (at 330) bits that represent 0 change in the aggregation level. If the target aggregation level is different than the current aggregation level, then the user equipment can generate (at 335) bits that represent the requested change in the aggregation level, e.g., +1 for an increase of one aggregation level, −1 for a decrease of one aggregation level, and the like. The feedback can then be transmitted (at 340) back towards the base station over the uplink.

Figure 4:
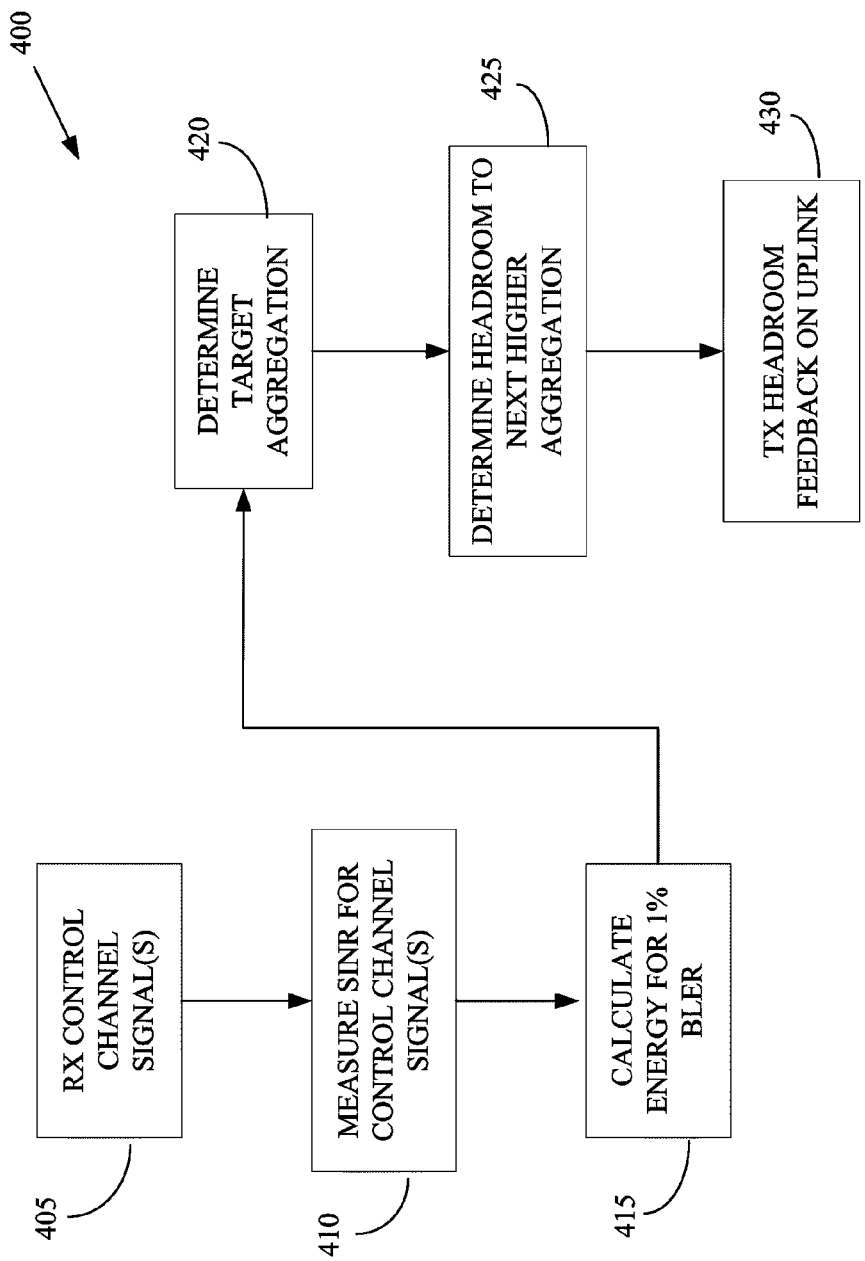
FIG. 4 conceptually illustrates a second exemplary embodiment of a method for generating control channel feedback.

FIG. 4 conceptually illustrates a second exemplary embodiment of a method 400 for generating control channel feedback. The second exemplary embodiment may be used in conjunction with or instead of the first exemplary embodiment shown in FIG. 3. In the illustrated embodiment, the user equipment receives (at 405) signals from abuse station over one or more downlink control channels that are transmitted at an initial aggregation level. The user equipment can then measure (at 410) signal strengths, interference levels, noise levels, and the like, which can be used to calculate signal-to-noise ratios (SNRs) and/or signal-to-interference-plus-noise ratios (SINRs) for the downlink control channels. These measurements can be used with known or estimated error rates to determine (at 415) an estimate of the energy needed to achieve a target value of the block error rate (BLER) for transmissions over the downlink control channels. A target aggregation level for the downlink control channels can be determined (at 420) based on the energy needed to achieve the 1% BLER.

The target aggregation level can then be used to determine (at 425) headroom to the next higher aggregation. As used herein, the term "headroom" refers to a measure of the difference between parameters such as the BLER, SNR, or SINR associated with one aggregation level and the same parameters that are expected at the next higher aggregation level. For example, the headroom may indicate that the current SINR measured for the downlink control channel transmitted at the current aggregation level (or an estimated SINR for the target aggregation level) is a certain number of decibels away from a threshold SINR that would indicate that the next higher aggregation level should be requested. When the target aggregation level is the same as the current aggregation level, then the headroom can be computed (at 425) between the current level and the next higher aggregation level based on measurements of downlink control channel signals. Alternatively, if the target aggregation level is different than the current aggregation level, the user equipment can estimate (at 425) the headroom between the target level and the next level using measurements and/or modeling. Information indicating the headroom can then be transmitted (at 130) towards the base station over the uplink. In alternative embodiments, the headroom feedback can be transmitted (at 430) alone or conjunction with other feedback bits.

Figure 5:
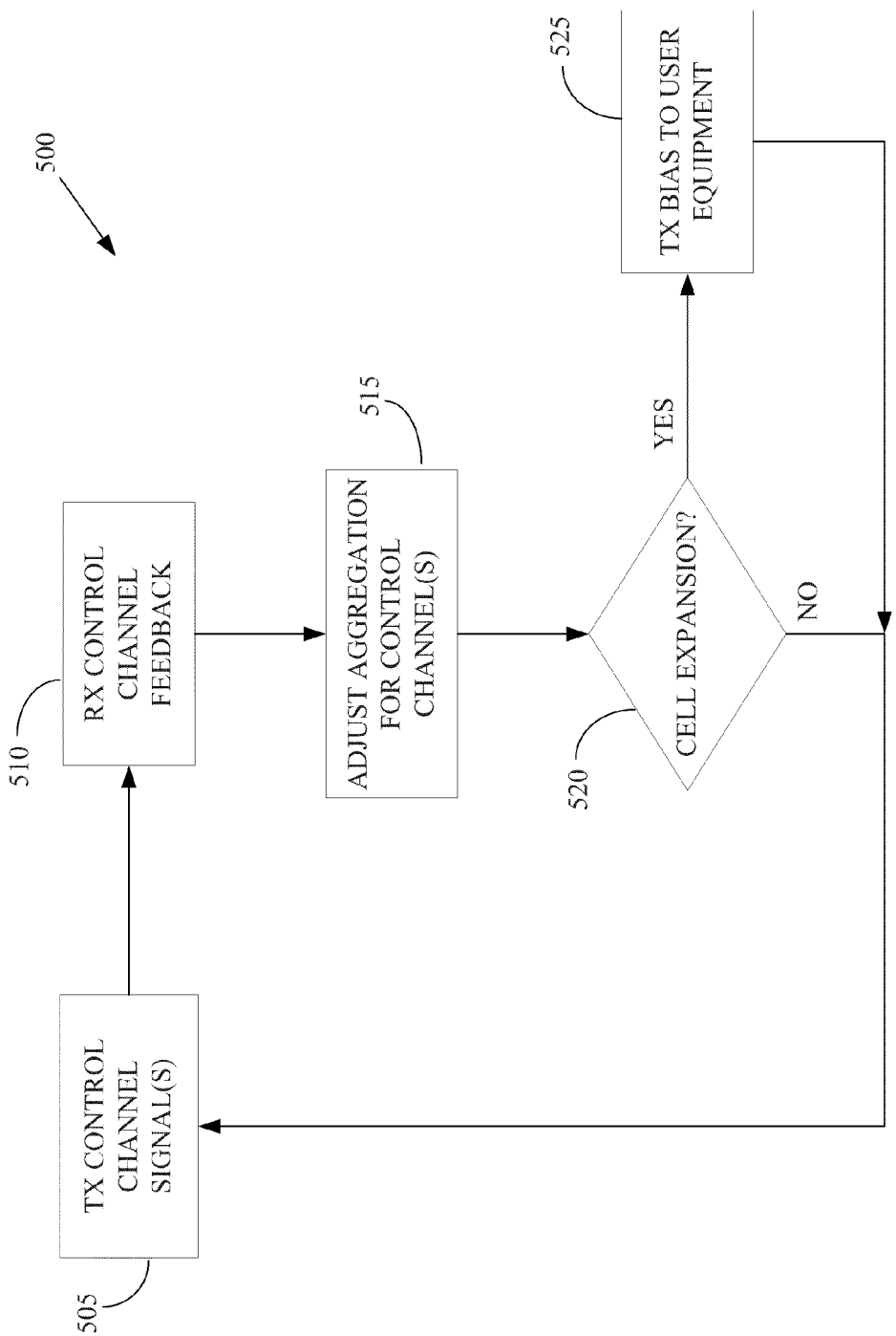
FIG. 5 conceptually illustrates one exemplary embodiment of a method for utilizing control channel feedback.

FIG. 5 conceptually illustrates one exemplary embodiment of a method 500 for utilizing control channel feedback. In the illustrated embodiment, the method 500 is implemented at a base station, access point, or other access node in the wireless communication system. The access node transmits (at 505) downlink control channel signals using an initial or current aggregation level. The access node then receives (at 510) control channel feedback in response to transmitting the downlink control channel signals. As discussed herein, the control channel feedback may include information indicating the requested change in aggregation level, headroom between a current or requested target aggregation level and the next higher aggregation level, and the like. The access node may then adjust (at 515) the aggregation level used for the downlink control channel based on the feedback. For example, if the feedback indicates and/or requests a higher aggregation level, the access node can modify (at 515) the aggregation level to increase the aggregation level used for the downlink control channel. Alternatively, the access node can decrease (at 515) the aggregation level or leave the aggregation level unchanged (at 515) depending on the information included in the feedback.

In one embodiment, the access node can also determine (at 520) whether to perform cell expansion. The decision can be made at least in part based upon the feedback information, as well as other criteria such as system capacity, load-balancing, and the like. For example, if the access node receives feedback that indicates that user equipment can achieve a 1% BLER (or some other value) over the downlink control channel when it hands off to an "expanded" microcell in an overlapping macrocell/microcell environment, then the access node may elect to perform cell expansion for this user equipment. Cell expansion may therefore be performed on a per-user equipment basis by transmitting (at 525) a bias or offset value to the user equipment. The bias allows or instructs the user equipment to hand off to the microcell as long as the measured signal strength from the microcell is smaller than the measured signal strength from the macrocell by less than the bias. The access node can then continue to transmit (at 505) control channel signals to user equipment that are being served by the access node.

Embodiments of the techniques described herein may have a number of advantages over the techniques that provide indirect channel quality indication for the downlink control channel. For example, access nodes may receive a direct indication of downlink control channel performance, which may reduce or remove the uncertainty associated with attempting to estimate or predict the downlink control channel performance using downlink data channel feedback. The access node may therefore be able to adapt the downlink control channel aggregation level to avoid wastage of downlink control channel capacity. A precoded downlink control channel may also be used to minimize the cross-interference between the overlaying macrocells and microcell.

In one alternative embodiment, user equipment can provide feedback including an outage indicator. For example, user equipment could feedback a single bit indication when it the user equipment determines that it is about to experience outage of a downlink control channels such as the PDCCH. The user equipment may know that an outage is imminent when the received SNR for the downlink control channel falls below a configured threshold for downlink control channel detection at any aggregation level. Alternatively, the access node could set the value of $Q_{rxlevminoffset}$ for each user command through dedicated signaling. Currently, the value of $Q_{rxlevminoffset}$ is RRC broadcasted and is common to all user equipment in the cell. This approach may allow the access node to selectively optimize the turn on or off the cell biasing applied on a per-user equipment basis in order to remove the biasing when user equipment is close to being in outage. This approach may also reduce PDCCH outages while permitting user equipment that are not in jeopardy of being in outage to benefit from cell expansion.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method of providing feedback for control channels formed by aggregating groups of resource blocks or resource elements, the method comprising:
generating control channel feedback at user equipment, wherein the control channel feedback is generated using at least one measurement performed on at least one signal received at said user equipment over a downlink control channel at a current aggregation level, and wherein the control channel feedback comprises a headroom indication that indicates a difference between a signal-to-interference-plus-noise ratio (SINR) on the downlink control channel at a target aggregation level for the downlink control channel and a SINR at an aggregation level one level higher than the target aggregation level; and
transmitting the control channel feedback over an uplink channel.

2. The method of claim 1, wherein generating the control channel feedback comprises generating a channel quality indicator based on at least one measurement of a signal strength of said at least one signal received at said user equipment.

3. The method of claim 2 wherein generating the control channel feedback comprises determining the target aggregation level for the downlink control channel that achieves a predefined quality target over the downlink control channel.

4. The method of claim 3, wherein determining the target aggregation level comprises comparing the target aggregation level to the current aggregation level and generating at least one bit indicating at least one of an increase, a decrease, and no change in the current aggregation level.

5. The method of claim 3, wherein generating the control channel feedback comprises generating information indicating at least one of an increase, a decrease, and no change in the current aggregation level.

6. The method of claim 1, wherein generating the control channel feedback comprises generating a headroom indication that indicates a difference between an SINR on the downlink control channel at the current aggregation level and an SINR at an aggregation level one level higher than the current aggregation level.

7. The method of claim 1, comprising receiving information indicating a handoff bias for determining whether to hand off between a cell or sector that operates according to a first wireless access technology and a cell or sector that operates according to a second wireless technology, wherein the handoff bias is determined based upon the control channel feedback.

8. A method involving feedback for control channels formed by aggregating groups of resource blocks or resource elements, the method comprising:
receiving control channel feedback from user equipment at an access node, wherein the control channel feedback is generated using at least one measurement performed on at least one signal transmitted from the access node over a downlink control channel at a current aggregation level, and wherein the control channel feedback comprises a headroom indication that indicates a difference between a signal-to-interference-plus-noise ratio (SINR) at the user equipment at a target aggregation level for the downlink control channel and an SINR at an aggregation level one level higher than the target aggregation level; and
deciding whether to modify the current aggregation level based on the information conveyed by the control channel feedback.

9. The method of claim 8, wherein receiving the control channel feedback comprises receiving information indicative of the target aggregation level for the downlink control channel that provides a signal energy that achieves a predefined target quality at said user equipment.

10. The method of claim 9, wherein receiving said information indicative of the target aggregation level comprises receiving at least one bit indicating at least one of an increase, a decrease, and no change in the current aggregation level.

11. The method of claim 8, wherein receiving the control channel feedback comprises receiving a headroom indication that indicates a difference between an SINR at said user equipment at the current aggregation level and an SINR at an aggregation level one level higher than the current aggregation level.

12. The method of claim 8, comprising modifying the current aggregation level based on the information conveyed by the control channel feedback and transmitting control information on the downlink control channel at the modified aggregation level.

13. The method of claim 8, comprising determining a handoff bias to be used by said user equipment to determine whether to hand off between a first cell or sector and a second cell or sector.

14. The method of claim 13, wherein determining the handoff bias comprises determining the handoff bias between the first cell or sector that operates according to a first wireless access technology and the second cell or sector that operates according to a second wireless technology, wherein the handoff bias is determined based upon the control channel feedback.

15. A method involving feedback for control channels formed by aggregating groups of resource blocks or resource elements, the method comprising:
receiving control channel feedback from user equipment at an access node, wherein the control channel feedback is generated using at least one measurement performed on at least one signal transmitted from the access node over a downlink control channel at a current aggregation level, and wherein the control channel feedback comprises a headroom indication that indicates a difference between a signal-to-interference-plus-noise ratio (SINR) at the user equipment at a target aggregation for the downlink control channel and an SINR at an aggregation level one level higher than the target aggregation level; and deciding whether to perform cell expansion based on the information conveyed by the control channel feedback.

16. The method of claim 15, wherein deciding whether to perform said cell expansion comprises determining a handoff bias to be used by said user equipment to determine whether to hand off between a cell or sector that operates according to a first wireless access technology and a cell or sector that operates according to a second wireless technology, wherein the handoff bias is determined based upon the control channel feedback.

17. The method of claim 15, comprising deciding whether to modify the current aggregation level based on the information conveyed by the control channel feedback.

18. The method of claim 15, wherein receiving the control channel feedback comprises receiving control channel feedback that conveys information indicating at least one of an increase, a decrease, and no change in the current aggregation level.

* * * * *